（12） United States Patent
Yamawaki et al.

(10) Patent No.: US 10,181,596 B2
(45) Date of Patent: Jan. 15, 2019

(54) SECONDARY BATTERY

(71) Applicant: Sanyo Electric Co., Ltd., Daito-shi, Osaka (JP)

(72) Inventors: Takuya Yamawaki, Hyogo (JP); Eiji Okutani, Hyogo (JP); Masakazu Yamada, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 161 days.

(21) Appl. No.: 15/214,765

(22) Filed: Jul. 20, 2016

(65) Prior Publication Data

US 2017/0025666 A1    Jan. 26, 2017

(30) Foreign Application Priority Data

Jul. 21, 2015  (JP) ................... 2015-143911

(51) Int. Cl.
*H01M 2/06* (2006.01)
*H01M 2/34* (2006.01)
*H01M 2/26* (2006.01)

(52) U.S. Cl.
CPC ............ *H01M 2/345* (2013.01); *H01M 2/06* (2013.01); *H01M 2/263* (2013.01)

(58) Field of Classification Search
None
See application file for complete search history.

(56) References Cited

U.S. PATENT DOCUMENTS

| 2008/0038627 A1 | 2/2008 | Yamauchi et al. |
| 2008/0038628 A1 | 2/2008 | Yamauchi et al. |
| 2010/0233529 A1 | 9/2010 | Nansaka et al. |
| 2013/0067727 A1 | 3/2013 | Nansaka et al. |
| 2013/0067728 A1 | 3/2013 | Nansaka et al. |
| 2013/0095352 A1 | 4/2013 | Yamauchi et al. |
| 2013/0196185 A1 | 8/2013 | Yokoyama et al. |
| 2013/0196220 A1 | 8/2013 | Okutani et al. |
| 2015/0303443 A1 | 10/2015 | Yokoyama et al. |
| 2016/0336580 A1* | 11/2016 | Wakimoto ............ H01M 2/345 |

FOREIGN PATENT DOCUMENTS

| JP | 2008-66254 A | 3/2008 |
| JP | 2008-66255 A | 3/2008 |
| JP | 2010-212034 A | 9/2010 |
| JP | 2013-157099 A | 8/2013 |
| JP | 2013-175428 A | 9/2013 |

* cited by examiner

*Primary Examiner* — Tracy M Dove
(74) *Attorney, Agent, or Firm* — Westerman, Hattori, Daniels & Adrian, LLP

(57) ABSTRACT

A positive electrode sheet is electrically connected to a positive terminal with a positive electrode current collector, a deformable plate, and a conductive member interposed therebetween. When the pressure inside a battery is higher than or equal to a predetermined value, the deformable plate is deformed toward a sealing plate and an annular groove formed on a base portion of the positive electrode current collector is broken due to deformation of the deformable plate so that a conductive path between the positive electrode sheet and the positive terminal is disconnected. A first insulating member disposed between the deformable plate and the base portion of the positive electrode current collector includes a first rotation preventing protrusion on a surface thereof on a wound electrode body side and outside an outer circumferential edge of the base portion of the positive electrode current collector.

19 Claims, 9 Drawing Sheets

6

6

SECONDARY BATTERY

CROSS REFERENCE TO RELATED APPLICATIONS

The present invention application claims priority to Japanese Patent Application No. 2015-143911 filed in the Japan Patent Office on Jul. 21, 2015, the entire contents of which are incorporated herein by reference.

BACKGROUND OF THE INVENTION

Field of the Invention

The present invention relates to a secondary battery including a current interrupt mechanism.

Description of Related Art

Secondary batteries such as lithium-ion secondary batteries are used in stationary storage battery systems used for suppressing power variation of for example, power sources for driving electric vehicles (EVs) and hybrid electric vehicles (HEVs or PHEVs), photovoltaics, and wind power generation, or used for peak shift of system power that allows power to be stored during the nighttime and to be used during the daytime. A high capacity property and a high output property are required for use in EVs, HEVs, and PHEVs, and for stationary storage batters systems. Accordingly, the size of individual batteries has increased and many batteries are connected to each other in series or in parallel when used.

Batteries for such use are required to be significantly safer compared with secondary batteries for use in small portable equipment because materials having very high reactivity are used, particularly in the case where non-aqueous electrolyte secondary batteries are used. Accordingly, prismatic secondary batteries for the above use include a current interrupt mechanism that interrupts an electrical connection between an external terminal and an electrode body when the pressure inside a battery exterior body is increased as disclosed in, for example, Japanese Published Unexamined Patent Application No. 2008-66254 (Patent Document 1), Japanese Published Unexamined Patent Application No. 2008-66255 (Patent Document 2), Japanese Published Unexamined Patent Application No. 2010-212034 (Patent Document 3), Japanese Published Unexamined Patent Application No. 2013-175428 (Patent Document 4), Japanese Published Unexamined Patent Application No. 2013-157099 (Patent Document 5).

BRIEF SUMMARY OF THE INVENTION

An object of the present invention is to provide a secondary battery including a more reliable current interrupt mechanism.

A secondary battery according to an embodiment of the present invention includes an electrode body that includes a positive electrode sheet and a negative electrode sheet, a current collector that is connected to the positive electrode sheet or the negative electrode sheet, an exterior body that has an opening and contains the electrode body, a sealing plate that seals the opening, a terminal that is electrically connected to the current collector and that is attached to the sealing plate, a conductive member that has an opening portion on an electrode body side and that is disposed on a side nearer to the electrode body than the sealing plate, and a conductive deformable plate that seals the opening portion. The current collector, the deformable plate, the conductive member, and the terminal are electrically connected to one another. The current collector includes a base portion disposed on the electrode body side of the deformable plate. The current collector is connected to the deformable plate at the base portion. A first insulating member is disposed between the deformable plate and the base portion. The first insulating member is connected to the conductive member and the base portion. The first insulating member includes a rotation preventing protrusion on a surface thereof on the electrode body side and outside an outer circumferential edge of the base portion. When a pressure inside the battery is higher than or equal to a predetermined value, the deformable plate is deformed and a fragile portion is broken due to deformation of the deformable plate so that a conductive path between the positive electrode sheet or the negative electrode sheet and the terminal is disconnected.

With the above structure, the secondary battery includes a pressure-sensitive current interrupt mechanism and is hence reliable. The first insulating member and the conductive member are connected to each other and the first insulating member and the base portion of the current collector are connected to each other. This enables the fragile portion, which is a port at which breakage is expected, disposed on the conductive path to be prevented from being damaged due to a load applied when the secondary battery is strongly impacted or vibrated.

In the case where the first insulating member is connected to the base portion of the current collector, a load on the portion at which breakage is expected is decreased. The first insulating member, however, carries a risk of being deformed when a force is applied to the first insulating member because the first insulating member is typically made of a resin. Accordingly, even in the case where the first insulating member and the base portion of the current collector are connected to each other, when a force is applied in a direction in which the base portion of the current collector is moved so as to be rotated in the horizontal direction, the base portion of the current collector may be rotated with respect to the first insulating member and a load may be applied to the portion at which breakage is expected. This problem is likely to occur particularly when a relatively soft resin is used for the first insulating member.

In the secondary battery according to the embodiment of the present invention, the rotation preventing protrusion is disposed on the surface of the first insulating member on the electrode body side and outside an outer circumferential edge of the base portion of the current collector in addition to a joint at which the first insulating member is connected to the base portion of the current collector. Thus, the rotation preventing protrusion enables the base portion of the current collector to be prevented from being rotated in the horizontal direction. Accordingly, the portion (fragile portion), at which breakage is expected, disposed on the conductive path can be more reliably prevented from being subjected to a load. The secondary battery thus becomes more reliable.

The portion at which breakage is expected may be a fragile portion such as a thin portion or a groove formed on the base portion of the current collector or the deformable plate. Alternatively, the portion at which breakage is expected may be a joint between the deformable plate and the base portion of the current collector. The terminal may be directly attached to the sealing plate or may be attached thereto with an insulating member interposed therebetween.

The first insulating member preferably includes at least two of the rotation preventing protrusions. When the first insulating member includes a plurality of the rotation preventing protrusions, the base portion of the current collector can be more reliably prevented from being rotated in the horizontal direction.

The outer circumferential edge of the base portion preferably includes a rectilinear first end side portion and a rectilinear second end side portion. The first insulating member preferably includes a first rotation preventing protrusion and a second rotation preventing protrusion as the rotation preventing protrusions. The first rotation preventing protrusion is preferably disposed outside the first end side portion. The second rotation preventing protrusion is preferably disposed outside the second end side portion.

The first insulating member preferably includes a protrusion, and the base portion preferably includes a through-hole or a notch. The protrusion is preferably fitted into the through-hole or the notch so that the first insulating member is connected to the base portion.

The first insulating member preferably includes a protrusion, and the base portion preferably includes a through-hole or a notch. The protrusion is preferably fitted into the through-hole or the notch and a diameter of a tip of the protrusion is preferably increased so that a securing portion at which the first insulating member is secured to the base portion is formed. At least three of the securing portions are preferably formed.

The first insulating member is preferably directly connected to the conductive member.

A second insulating member is preferably disposed between the sealing plate and the conductive member. The terminal, the second insulating member, and the conductive member are preferably secured to the sealing plate. The first insulating member is preferably directly connected to the second insulating member. The first insulating member is preferably connected to the conductive member with the second insulating member interposed therebetween.

A diameter of a tip of the rotation preventing protrusion is preferably smaller than or equal to a diameter of a bottom of the rotation preventing protrusion.

The first insulating member preferably includes a plurality of the rotation preventing protrusions. The first insulating member preferably includes a plurality of the rotation preventing protrusions that are disposed so as to be aligned along a rectilinear end side of the base portion of the current collector, and a pair of the rotation preventing protrusions that are disposed so as to interpose the base portion of the current collector therebetween.

DETAILED DESCRIPTION OF THE INVENTION

An embodiment of the present invention will be described below in detail. However, the present invention is not intended to be specified by the embodiment.

Figure 1B:
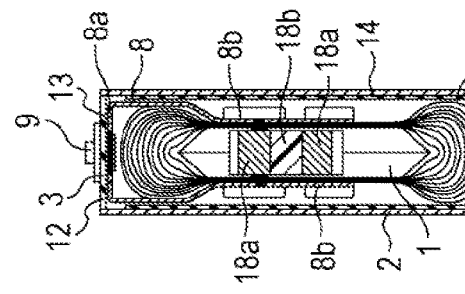
FIG. 1B is a sectional view of the prismatic secondary battery along line IB-IB in FIG. 1A.
Figure 1A:
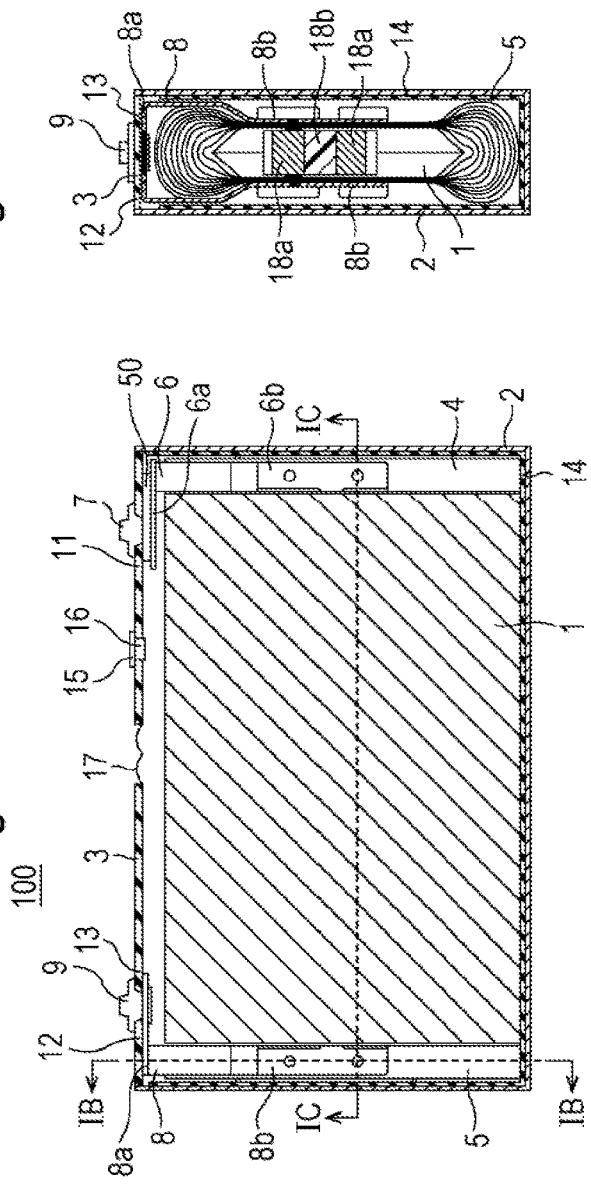
FIG. 1A is a sectional view of a prismatic secondary battery according to an embodiment.
Figure 1C:
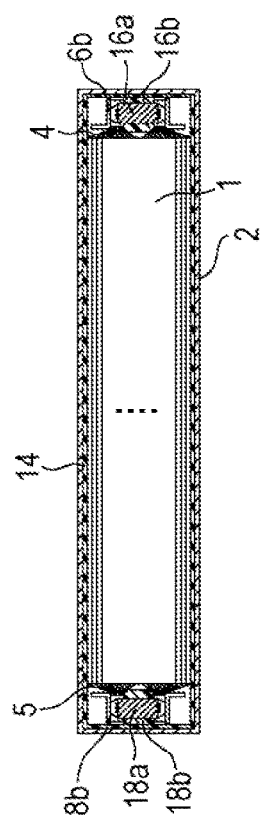
FIG. 1C is a sectional view of the prismatic secondary battery along line IC-IC FIG. 1A.

A prismatic secondary battery 100 according to the embodiment will be first described with reference to FIG. 1A to FIG. 1C. The prismatic secondary battery 100 includes a prismatic exterior body 2 having an opening at an upper portion thereof and a sealing plate 3 that seals the opening. The prismatic exterior body 2 and the sealing plate 3 constitute a battery case. The prismatic exterior body 2 and the sealing plate 3 are each made of a metal and preferably made of aluminum or an aluminum alloy. The prismatic exterior body 2 contains an electrolyte and a wound electrode body 1 that is flat and obtained by winding a positive electrode sheet and a negative electrode sheet with a separator interposed therebetween (these components are not shown in the figures). In the positive electrode sheet, a positive electrode active material mixture layer containing a positive electrode active material is formed on a metallic positive electrode core and a portion at which the positive electrode core is exposed is formed in the longitudinal direction. In the negative electrode sheet, a negative electrode active material mixture layer containing a negative electrode active material is formed on a metallic negative electrode core and a portion at which the negative electrode core is exposed is formed in the longitudinal direction. The positive electrode core is preferably made of aluminum or an aluminum alloy. The negative electrode core is preferably made of copper or a copper alloy.

The wound electrode body 1 includes, on one side in a winding axis direction, an exposed positive electrode core portion 4 on which the positive electrode active material mixture layer is not formed and, on the other side in the winding axis direction, an exposed negative electrode core portion 5 on which the negative electrode active material mixture layer is not formed. A positive electrode current collector 6 is connected to the exposed positive electrode core portion 4. The positive electrode current collector 6 is electrically connected to a positive terminal 7. A negative electrode current collector 8 is connected to the exposed negative electrode core portion 5. The negative electrode current collector 8 is electrically connected to a negative terminal 9.

The positive electrode current collector 6 includes a base portion 6a that is disposed between the sealing plate 3 and the wound electrode body 1 and a pair of lead portions 6b extending from both ends of the base portion 6a toward the wound electrode body 1. The pair of the lead portions 6b are connected to the outer surface of the exposed positive electrode core portion 4 that is wound such that the exposed positive electrode core portion 4 that is wound is interposed between the pair of the lead portions 6b. The exposed positive electrode core portion 4 that is wound is divided into two pieces at the center of the positive electrode core in a direction in which layers of the positive electrode core are stacked. Two metallic positive electrode joint members 16a held by a positive electrode resin member 16b are disposed therebetween. The positive electrode current collector 6 is preferably made of aluminum or an aluminum alloy. The thickness of the positive electrode current collector 6 is preferably about 0.5 to 2 mm.

The negative electrode current collector 8 includes a base portion 8a that is disposed between the sealing plate 3 and the wound electrode body 1 and a pair of lead portions 8b extending from both ends of the base portion 8a toward the wound electrode body 1. The pair of the lead portions 8b are connected to the outer surface of the exposed negative electrode core portion 5 that is wound such that the exposed negative electrode core portion 5 that is wound is interposed between the pair of the lead portions 8b. The exposed negative electrode core portion 5 that is wound is divided into two pieces at the center of the negative electrode core in a direction in which layers of the negative electrode core are stacked. Two metallic negative electrode joint members 18a held by a negative electrode resin member 18b are disposed therebetween. The negative electrode current collector 8 is preferably made of copper or a copper alloy. The thickness of the negative electrode current collector 8 is preferably about 0.5 to 2 mm.

The positive terminal 7 is secured to the sealing plate 3 with an outer insulating member 11 interposed therebetween. The negative terminal 9 and the negative electrode current collector 8 are secured to the sealing plate 3 with an outer insulating member 13 and an inner insulating member 12 interposed therebetween, respectively. The positive terminal 7 is preferably made of a metal and is preferably made of aluminum or an aluminum alloy. The negative terminal 9 is preferably made of a metal and is preferably made of copper or a copper alloy.

The wound electrode body 1 is covered by an insulation seat 14 and contained in the prismatic exterior body 2. The sealing plate 3 is connected to the periphery of the opening of the prismatic exterior body 2 by welding such as laser welding. The sealing plate 3 includes an electrolytic solution injecting hole 15. The electrolytic solution injecting hole 15 is sealed by a sealing plug 16 after injection. A gas exhausting valve 17 through which gas is exhausted when the pressure inside the battery is higher than or equal to a predetermined value is formed in the sealing plate 3. A current interrupt mechanism 50 that operates and disconnects a conductive path when the pressure inside the battery is higher than or equal to a predetermined value is disposed on the conductive path between the positive electrode sheet and the positive terminal 7. The operating pressure of the current interrupt mechanism 50 is determined to be lower than the operating pressure of the gas exhausting valve 17.

Current Interrupt Mechanism

Figure 2:
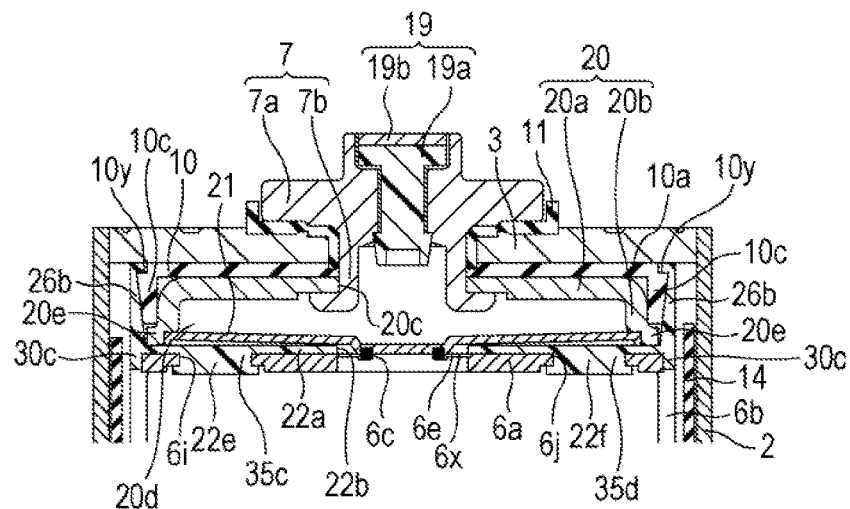
FIG. 2 is a sectional view of the prismatic secondary battery illustrated in FIGS. 1A to 1C viewed in the transverse direction of a sealing plate of a current interrupt mechanism disposed on the positive electrode side of the prismatic secondary battery.
Figure 3:
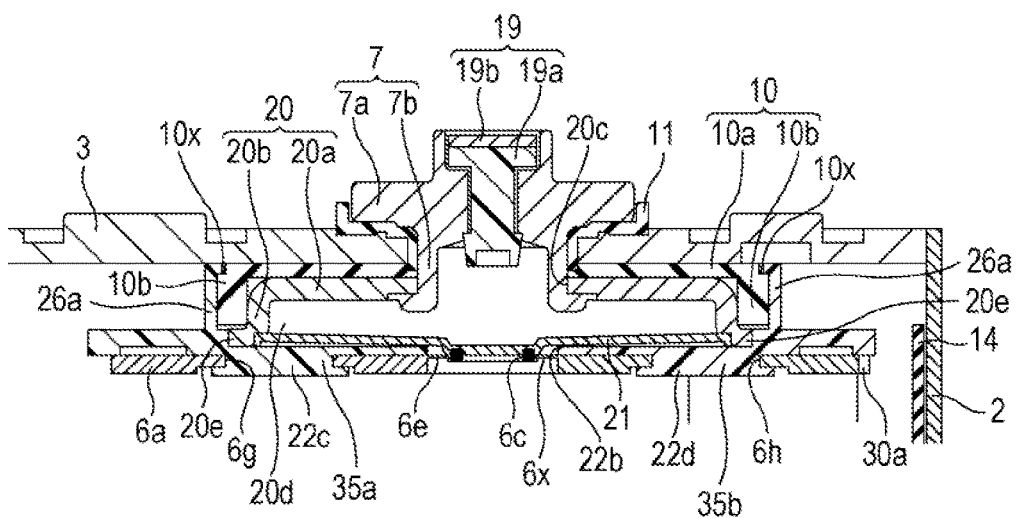
FIG. 3 is a sectional view of the prismatic secondary battery illustrated in FIGS. 1A to 1C viewed in the longitudinal direction of the sealing plate of the current interrupt mechanism disposed on the positive electrode side of the prismatic secondary battery.

The structure of the current interrupt mechanism 50 will be described with reference to FIG. 2 and FIG. 3. The positive terminal 7 includes a flange 7a that is disposed on the side nearer to the outside of the battery than the sealing plate 3 and an insertion portion 7b that is disposed on a surface of the flange 7a. The outer insulating member 11 is disposed on the surface of the sealing plate 3 on the outside of the battery. A second insulating member 10 is disposed on the surface of the sealing plate 3 on the inside of the battery and a conductive member 20 is disposed thereon. The insertion portion 7b of the positive terminal 7 is inserted from the outside of the battery into through-holes formed in the outer insulating member 11, the sealing plate 3, the second insulating member 10, and the conductive member 20. A tip of the insertion portion 7b is crimped on the conductive member 20. Thus, the positive terminal 7, the outer insulating member 11, the sealing plate 3, the second insulating member 10, and the conductive member 20 are integrally secured to each other.

The conductive member 20 made of a metal has a conductive member opening portion 20d on the side of the wound electrode body 1. The conductive member opening portion 20d of the conductive member 20 is sealed by a metallic deformable plate 21. The base portion 6a of the positive electrode current collector 6 is connected to the surface of the deformable plate 21 on the side of the wound electrode body 1. A first insulating member 22 is disposed between the deformable plate 21 and the base portion 6a of the positive electrode current collector 6. The first insulating member 22 includes a first body 22a disposed between the deformable plate 21 and the base portion 6a of the positive electrode current collector 6. A first through-hole 22b is formed in the first body 22a. The deformable plate 21 and the base portion 6a of the positive electrode current collector 6 are connected to each other via the first through-hole 22b.

In the base portion 6a of the positive electrode current collector 6, the periphery of a joint forming hole 6c is connected to the deformable plate 21 by welding. An annular thin region 6e is formed around the joint forming hole 6c. An annular groove 6x is formed on the thin region 6e so as to surround the joint forming hole 6c.

When the pressure inside the battery is higher than or equal to a predetermined value, a central portion of the deformable plate 1 is deformed toward the sealing plate 3 and hence the annular groove 6x formed on the base portion 6a of the positive electrode current collector 6 is broken so that the conductive path between the positive electrode sheet and the positive terminal 7 is disconnected.

The components will now be described.

Second Insulating Member

Figure 4:
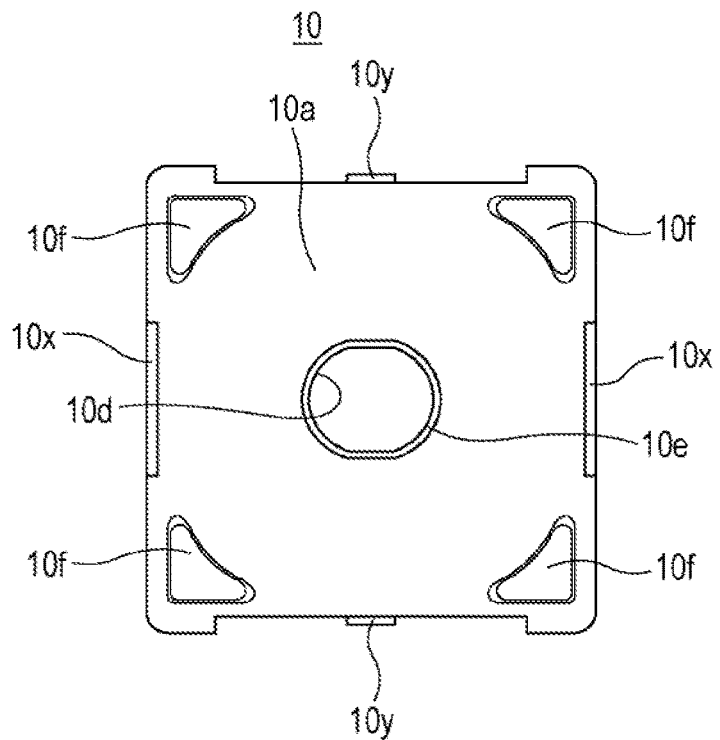
FIG. 4 is a top view of a second insulating member used in the prismatic secondary battery illustrated in FIGS. 1A to 1C.
Figure 5:
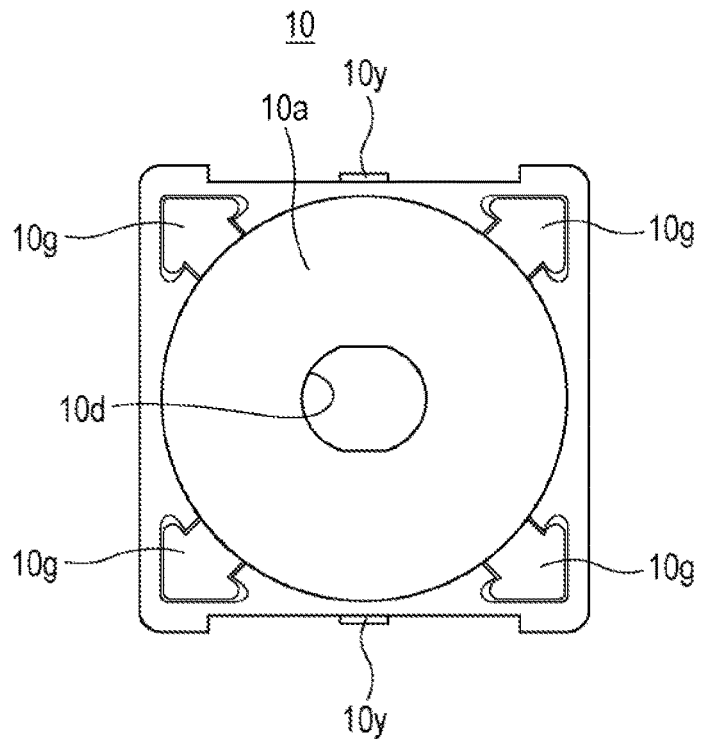
FIG. 5 is a bottom view of the second insulating member used in the prismatic secondary battery illustrated in FIGS. 1A to 1C.

FIG. 4 is a top view of the second insulating member 10 (surface on the side of the sealing plate 3). FIG. 5 is a bottom view of the second insulating member 10. The second insulating member 10 includes a second body 10a that is disposed between the sealing plate 3 and the conductive member 20. As illustrated in FIG. 3, a pair of first side walls 10b are form both ends of the second body 10a in the longitudinal direction of the sealing plate 3. As illustrated in FIG. 2, a pair of second side walls 10c are disposed on both ends of the second body 10a in the transverse direction of the sealing plate 3. First receiving portions 10x are formed on the first side walls 10b. Second receiving portions 10y are formed on the second side walls 10c. A second through-hole 10d is formed in the center of the second body 10a. The second through-hole 10d is formed into an oval shape so as to match the sectional shape of the insertion portion 7b of the positive terminal 7. A first thin portion 10e is disposed around the second through-hole 10d on the upper surface of the second body 10a. Second thin portions 10f are formed near four corners on the upper surface of the second body 10a. Third thin portions 10g are formed near the four corners on the lower surface of the second body 10a. Disposing the second thin portions 10f or the third thin portions 10g on the second body 10a enables bending of the second insulating member 10 to be suppressed. The second insulating member 10 is preferably made of a resin.

Conductive Member

The conductive member 20 includes a conductive member body 20a and a conductive member cylindrical portion 20b. The conductive member body 20a is disposed on the surface of the second body 10a of the second insulating member 10 on the side of the wound electrode body 1. A conductive member through-hole 20c is formed in the conductive member body 20a. The insertion portion 7b of the positive terminal 7 is inserted into the conductive member through-hole 20c. The conductive member cylindrical portion 20b is formed so as to extend from the outer circumferential edge of the conductive member body 20a toward the wound electrode body 1. The conductive member opening portion 20d is formed in the conductive member cylindrical portion 20b on the side of the wound electrode body 1. The conductive member opening portion 20d is sealed by the deformable plate 21. At the end of the conductive member cylindrical portion 20b on the side of the wound electrode body 1, a flange 20e that has an outer diameter larger than the outer diameter of an upper portion thereof is disposed. The conductive member is preferably made of a metal. In the case where the current interrupt mechanism is disposed on the positive electrode side, the conductive member is preferably made of aluminum or an aluminum alloy. The conductive member 20 is circular in plan view. However, a conductive member that is rectangular in plan view may be used as the conductive member 20.

Deformable Plate

The deformable plate 21 that is conductive is preferably made of a metal. In particular, in the case where the current interrupt mechanism is disposed on the positive electrode side, the deformable plate 21 is preferably made of aluminum or an aluminum alloy. The deformable plate 21 is circular in plan view. The shape of the deformable plate 21 may be a shape that matches the shape of the conductive member opening portion 20d of the conductive member 20.

First Insulating Member

Figure 6:
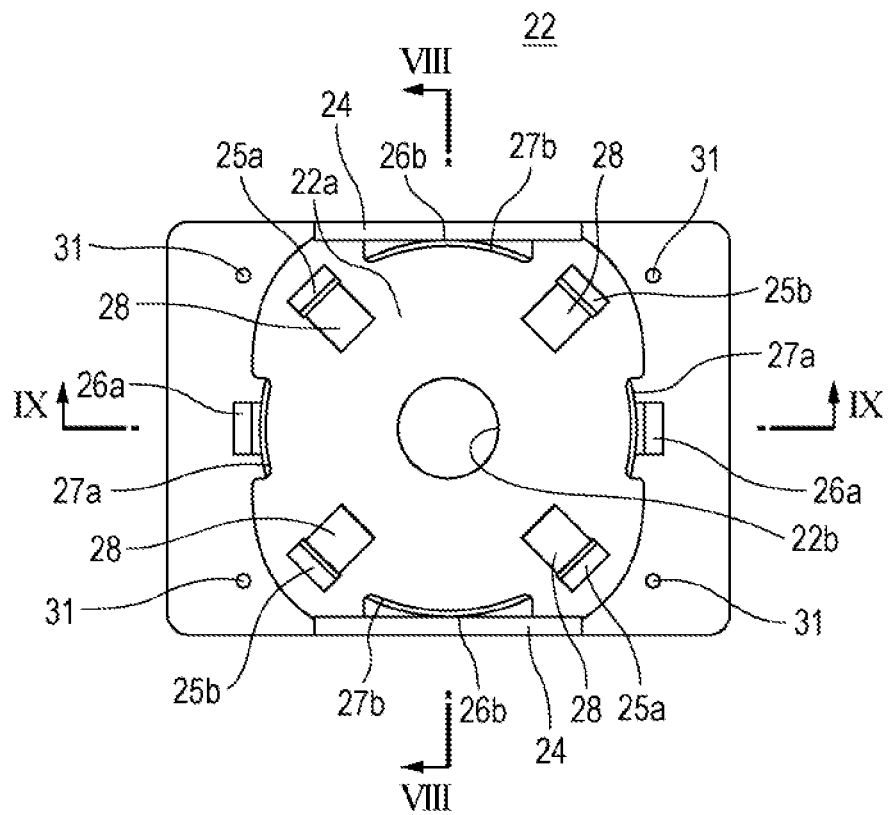
FIG. 6 is a top view of a first insulating member used in the prismatic secondary battery illustrated in FIGS. 1A to 1C.
Figure 7:
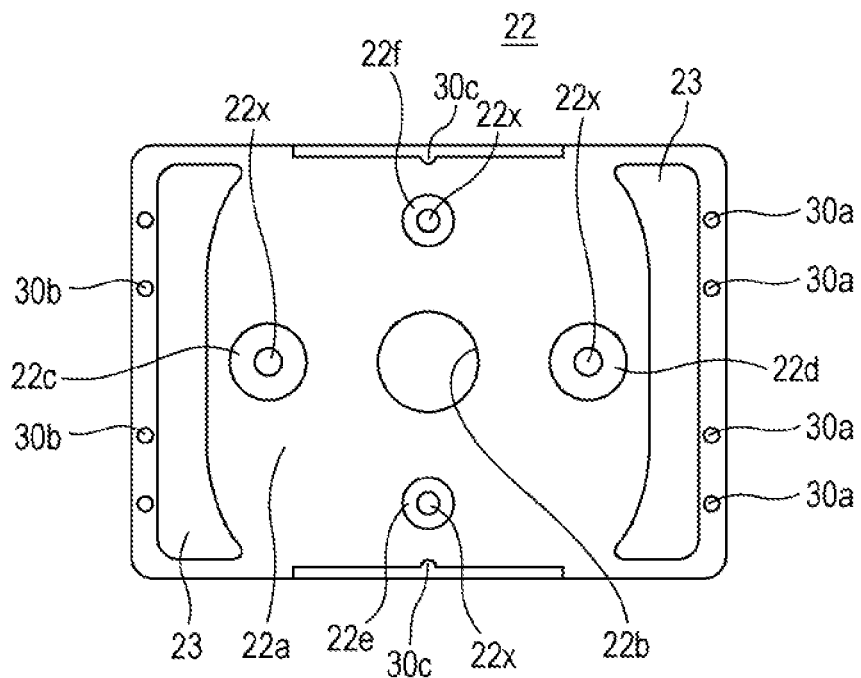
FIG. 7 is a bottom view of the first insulating member used in the prismatic secondary battery illustrated in FIGS. 1A to 1C.
Figure 8:
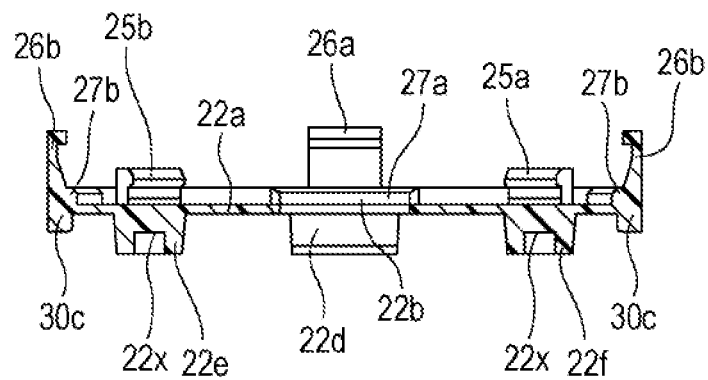
FIG. 8 is a sectional view of the first insulating member along VIII-VIII line in FIG. 6.
Figure 9:
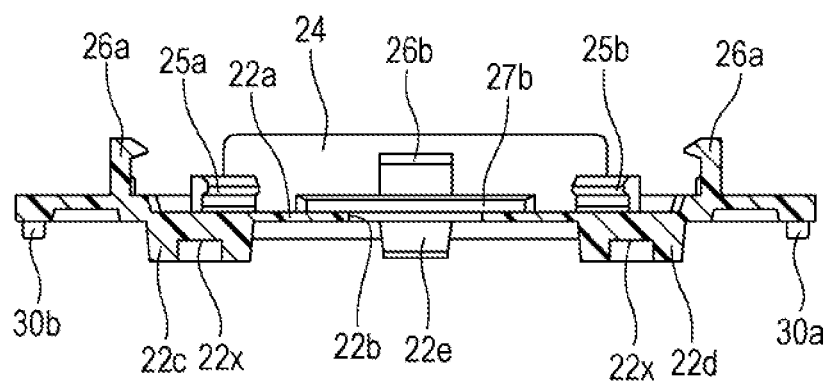
FIG. 9 is a sectional view of the first insulating member along IX-IX line in FIG. 6.

FIG. 6 is a top view of the first insulating member 22 (surface on the side of the sealing plate 3). FIG. 7 is a bottom view of the first insulating member 22. FIG. 8 is a sectional view of the first insulating member 22 along line in FIG. 6. FIG. 9 is a sectional view of the first insulating member 22 along IX-IX line in FIG. 6.

The first insulating member 22 includes the first body 22a that is disposed between the deformable plate 21 and the base portion 6a of the positive electrode current collector 6. The first through-hole 22b is formed in the center of the first body 22a. The deformable plate 21 and the base portion 6a of the positive electrode current collector 6 are connected to each other via the first through-hole 22b.

As illustrated in FIG. 6, on the tipper surface of the first body 22a of the first insulating member 22, as pair of third catch portions 25a are disposed so as to face each other with the first through-hole 22b interposed therebetween and a pair of fourth catch portions 25b are disposed so as to face each other with the first through-hole 22b interposed therebetween. The third catch portions 25a and the fourth catch portions 25b are caught on the flange 20e of the conductive member 20. Thus, the first insulating member 22 is connected to the conductive member 20. On the upper surface of the first body 22a, protruding portions 28 are formed at the bottoms of the third catch portions 25a and the fourth catch portions 25b. Disposing the protruding portions 28 enables the conductive member 20 and the first insulating member 22 to be more thinly secured to each other in a catching manner and enables the first insulating member 22 to be more reliably prevented from being misaligned in the vertical direction with respect to the conductive member 20. It is to be noted that the protruding portions 28 are not essential components. The height of the protruding portions 28 may be very low, for example, from several micrometers to several tens of micrometers.

On the upper surface of the first body 22a of the first insulating member 22, a pair of first catch portions 26a are disposed so as to face each other with the first through-hole 22b interposed therebetween and a pair of second catch portions 26b are disposed so as to face each other with the first through-hole 22b interposed therebetween. The pair of the first catch portions 26a are disposed so as to be aligned in the longitudinal direction of the sealing plate 3. The pair of the second catch portions 26b are disposed so as to be aligned in the transverse direction of the sealing plate 3. The first catch portions 26a are caught on the first receiving portions 10x of the second insulating member 10. The second catch portions 26b are caught on the second receiving portions 10y of the second insulating member 10. Thus, the first insulating member 22 is connected to the second insulating member 10.

Insulating member rotation preventing protrusions 31 are disposed on the upper surface of the first body 22a of the first insulating member 22. The insulating member rotation preventing protrusions 31 are disposed on the outer surface side of the first side walls 10b of the second insulating member 10. The insulating member rotation preventing protrusions 31 are brought into contact with or caused to approach (for example, up to a distance of 1 mm or less) the respective first side walls 10b on the outer surface side, and the first insulating member 22 can thereby be more reliably prevented from being rotated in the horizontal direction with respect to the second insulating member 10. In the case where the insulating member rotation preventing protrusions 31 are caused to approach the respective first side walls 10b on the outer surface side, the shortest distance between the first side walls 10b and the insulating member rotation preventing protrusions 31 are preferably 1 mm or less, more preferably 0.5 mm or less. Although a plurality of the insulating member rotation preventing protrusions 31 are preferably disposed, the first insulating member 22 can be prevented from being rotated with respect to the second insulating member 10, provided that at least one insulating member rotation preventing protrusion 31 is disposed.

A pair of first pressing portions 27a and a pair of second pressing portions 27b are disposed on the upper surface of the first body 22a of the first insulating member 22. The pair of the first pressing portions 27a interpose the flange 20e of the conductive member 20 from both sides. Thus, the first insulating member 22 can be reliably prevented from being misaligned in the longitudinal direction of the sealing plate 3 with respect to the conductive member 20. The pair of the second pressing portions 27b interpose the flange 20e of the conductive member 20 from both sides. Thus, the first insulating member 22 can be reliably prevented from being misaligned in the transverse direction of the sealing plate 3 with respect to the conductive member 20. As illustrated in FIG. 6, the first pressing portions 27a or the second pressing portions 27b are preferably formed into a curved shape that matches the shape of the outer circumference of the conductive member 20.

A pair of third side walls 24 are disposed on the upper surface of the first body 22a of the first insulating member 22. The third side walls 24 are disposed on the outer surface side of the second side walls 10c of the second insulating member 10. In the first insulating member 22, parts of the third side walls 24 constitute the respective second catch portions 26b.

Figure 11:
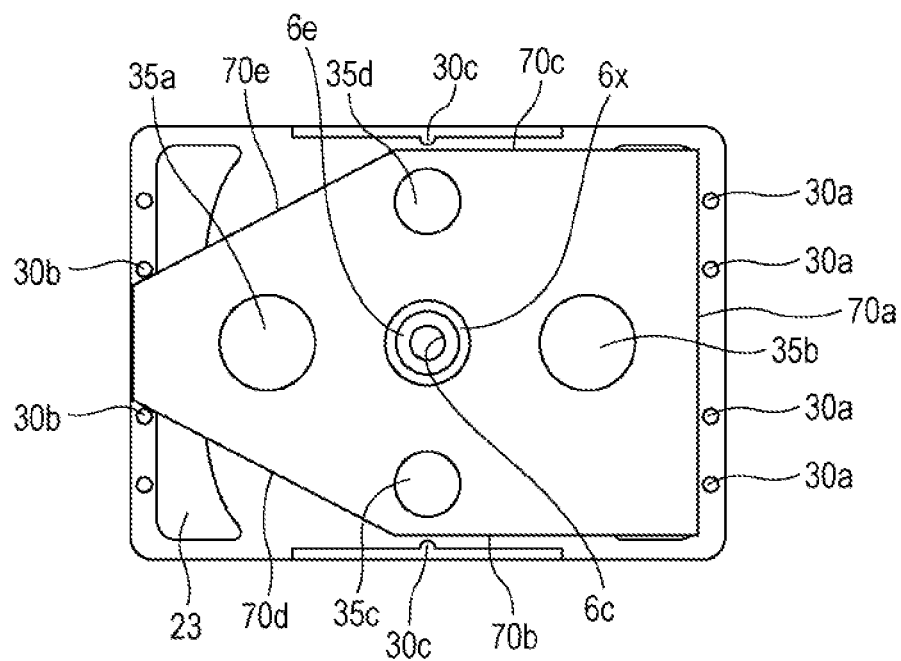
FIG. 11 is a bottom view of the first insulating member to which the current collector is attached.

As illustrated in FIG. 7, a first protrusion 22c, a second protrusion 22d, a third protrusion 22e, a fourth protrusion 22f are disposed on the lower surface of the first body 22a of the first insulating member 22. The first protrusion 22c, the second protrusion 22d, the third protrusion 22e, and the fourth protrusion 22f are inserted into a first opening 6g, a second opening 6h, a third opening 6i, and a fourth opening 6j formed in the base portion 6a of the positive electrode current collector 6, and the diameters of the tips thereof are increased by thermal crimping. As illustrated in FIG. 11, a first securing portion 35a, a second securing portion 35b, a third securing portion 35c, and a fourth securing portion 35d are consequently formed. Recessed portions 22x are preferably formed on the surfaces of the tips of the first protrusion 22c, the second protrusion 22d, the third protrusion 22e, and the fourth protrusion 22f before thermal crimping. Thus, the diameters of the first protrusion 22c, the second protrusion 22d, the third protrusion 22e, and the fourth protrusion 22f are more uniformly increased, and the first insulating member 22 and the base portion 6a of the positive electrode current collector 6 are more firmly secured to each other. In addition, even when the first insulating member 22 has a relatively high softening point or melting point, thermal crimping can be readily performed.

As illustrated in FIG. 7, first rotation preventing protrusions 30a, second rotation preventing protrusions 30b, and third rotation preventing protrusions 30c are disposed on the lower surface of the first body 22a of the first insulating member 22.

As illustrated in FIG. 11, in a state after the positive electrode current collector 6 is connected to the first insulating member 22, the first rotation preventing protrusions 30a, the second rotation preventing protrusions 30b, and the third rotation preventing protrusions 30c are disposed outside outer circumferential edges of the base portion 6a of the positive electrode current collector 6. The first rotation preventing protrusions 30a, the second rotation preventing protrusions 30b, and the third rotation preventing protrusions 30c are disposed so as to be in contact with or approach the outer circumferential edges of the base portion 6a of the positive electrode current collector 6. In the case where the first rotation preventing protrusions 30a, the second rotation preventing protrusions 30b, and the third rotation preventing protrusions 30c are caused to approach the outer circumferential edges of the base portion 6a, the shortest distances between the outer circumferential edges of the base portion 6a and the first rotation preventing protrusions 30a, the second rotation preventing protrusions 30b, and third rotation preventing protrusions 30c are preferably 1 mm or less, more preferably 0.5 mm or less.

The first rotation preventing protrusions 30a are disposed so as to be in contact with or approach the outer circumferential edge of the base portion 6a of the positive electrode current collector 6 that is located outside the sealing plate 3 in the longitudinal direction of the sealing plate 3. The first rotation preventing protrusions 30a are formed along the outer circumferential edge of the base portion 6a of the positive electrode current collector 6 so as to be spaced apart from each other. A protrusion that is linear in plan view may be disposed instead of the first rotation preventing protrusions 30a. The diameter of the tip of each first rotation preventing protrusion 30a is smaller than or equal to the diameter of the bottom thereof.

The pair of the second rotation preventing protrusions 30b are disposed at positions at which the second rotation preventing protrusions 30b interpose a narrow region 6y formed on the base portion 6a of the positive electrode current collector 6 from both sides in the transverse direction of the sealing plate 3. The diameter of the tip of each second rotation preventing protrusion 30b is smaller than or equal to the diameter of the bottom thereof.

The pair of the third rotation preventing protrusions 30c are disposed at positions at which the third rotation preventing protrusions 30c interpose a wide region 6z of the base portion 6a of the positive electrode current collector 6 from both sides in the transverse direction of the sealing plate 3.

Disposing the rotation preventing protrusions on the lower surface of the first insulating member 22 enables the base portion 6a of the positive electrode current collector 6 to be prevented from being rotated in the horizontal direction with respect to the first insulating member. It is not necessary to dispose all of the first rotation preventing protrusions 30a, the second rotation preventing protrusions 30b, and the third rotation preventing protrusions 30c. However, at least two rotation preventing protrusions are preferably disposed. The two rotation preventing protrusions are preferably disposed so as to be each located outside two different outer circumferential edges of the base portion 6a of the positive electrode current collector 6. At least three rotation preventing protrusions are more preferably disposed. In this case, the three rotation preventing protrusions are preferably disposed so as to be each located outside three different outer circumferential edges of the base portion 6a of the positive electrode current collector 6.

Fourth thin portions 23 are formed on the lower surface of the first body 22a of the first insulating member 22. Thus, the first body 22a of the first insulating member 22 can be prevented from being bent.

The first insulating member 22 has line symmetry with respect to a line that passes through the center of the first through-hole 22b and extends in the transverse direction of the sealing plate 3 (bilateral symmetry in FIG. 6 and FIG. 7).

This enables assembly to be done without any problem even when the disposed component faces an direction.

Positive Electrode Current Collector

Figure 10A:
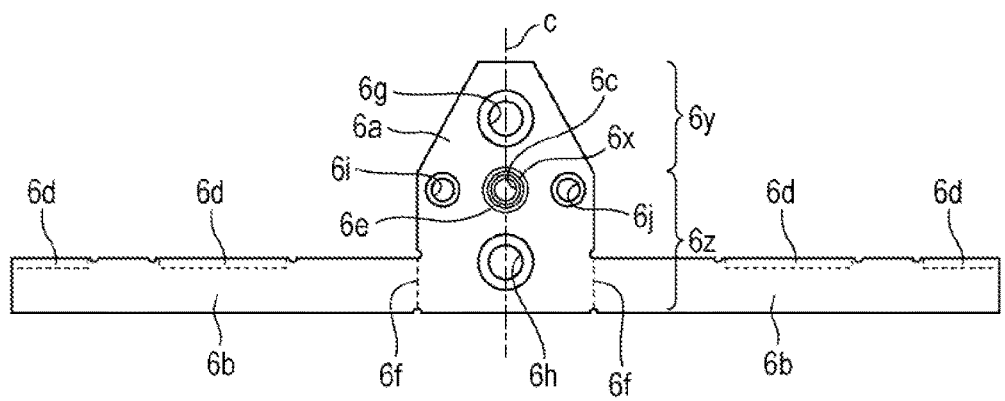
FIG. 10A is a front view of a positive electrode current collector used in the prismatic secondary battery illustrated in FIGS. 1A to 1C when the positive electrode current collector is unfolded.
Figure 10B:
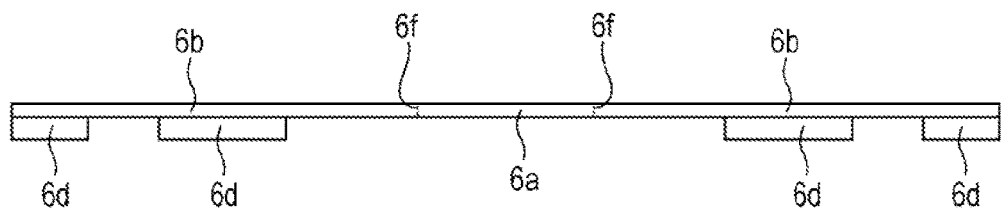
FIG. 10B is a side view of the positive electrode current collector.

FIG. 10A is a diagram of the positive electrode current collector 6 unfolded and illustrates a surface thereof on the side of the wound electrode body 1. FIG. 10B is a side view of FIG. 10A. The positive electrode current collector 6 includes the base portion 6a in a plate shape that is disposed between the sealing plate 3 and the wound electrode body 1, and the pair of the lead portions 6b that extend from both ends of the base portion 6a toward the wound electrode body 1 and that are connected to the wound electrode body 1. The lead portions 6b are folded at folded portions 6f with respect to the base portion 6a.

Ribs 6d are disposed at edge portions of the lead portions 6b on the center side (upper side in FIG. 10A) of the wound electrode body 1 in the width direction (vertical direction in FIG. 10A) of the lead portions 6b and at positions corresponding to portions of the lead portions 6b that are connected to the exposed positive electrode core portion 4. The joint forming hole 6e is formed in the base portion 6a. The base portion 6a is connected at the periphery of the joint forming hole 6c to the deformable plate 21 by, for example, laser welding. The thin region 6e is formed around the joint forming hole 6c. The annular groove 6x is formed on the thin region 6e so as to surround the joint forming hole 6c. The first opening 6g and the second opening 6h are formed on both sides of the joint forming hole 6c in the longitudinal direction of the sealing plate 3. The first opening 6g and the second opening 6h are aligned along a line c that passes through the center of the joint forming hole 6c and extends in the longitudinal direction of the sealing plate 3. The third opening 6i and the fourth opening 6j are formed on both sides of the joint forming hole 6c in the transverse direction of the sealing plate 3. In the base portion 6a the narrow region 6y that is narrower than the wide region 6z (width in the transverse direction of the sealing plate 3) is formed on the center side of the sealing plate 3 in the longitudinal direction of the sealing plate 3. The lead portions 6b are disposed in the wide region 6z.

Procedure of Assembly of Conductive Path

A method of assembling a positive electrode conductive path will now be described.

The outer insulating member 11 is disposed on the sealing plate 3 on the outside of the battery. The second insulating member 10 is disposed on the sealing plate 3 on the inside of the battery and the conductive member 20 is disposed thereon. The insertion portion 7b of the positive terminal 7 is inserted from the outside of the battery into the through-holes formed in the outer insulating member 11, the sealing plate 3, the second insulating member 10, and the conductive member 20. A tip of the insertion portion 7b is crimped on the conductive member 20. Thus, the positive terminal 7, the outer insulating member 11, the second insulating member 10, and the conductive member 20 are integrally secured to each other. The tip of the insertion 7b is preferably welded to the conductive member 20 by laser welding.

The conductive member opening portion 20d of the conductive member 20 on the side of the wound electrode body 1 is subsequently closed by the deformable plate 21. The outer circumferential edge of the deformable plate 21 are welded to the flange 20e of the conductive member 20 by laser welding. Thus, the conductive member opening portion 20d is sealed.

The first protrusion 22c, second protrusion 22d, third protrusion 22e, and fourth protrusion 22f of the first insulating member are subsequently inserted into the first opening 6g, the second opening 6h, the third opening 6i, and the fourth opening 6j that are formed in the base portion 6a of the positive electrode current collector 6, respectively. The diameters of the tips of the first protrusion 22c, second protrusion 22d, third protrusion 22e, and fourth protrusion 22f of the first insulating member 22 are increased by thermal crimping so that the first securing portion 35a, the second securing portion 35b, the third securing portion 35c, and the fourth securing portion 35d are formed. Thus, the positive electrode current collector 6 is connected to the first insulating member 22. At least one securing portion needs to be formed between the positive electrode current collector 6 and the first insulating member 22. At least two securing portions are preferably formed. At least three securing portions are more preferably formed. It is further preferable for the three securing portions not to be aligned.

The first insulating member 22 to which the positive electrode current collector 6 is connected is subsequently connected to the second insulating member 10. Specifically, the connection is made in a manner in which the first catch portions 26a and second catch portions 26b of the first insulating member 22 are caught on the first receiving portions 10x and second receiving portions 10y of the second insulating member 10, respectively, and the third catch portions 25a and fourth catch portions 25b of the first insulating member are caught on the flange 20e of the conductive member 20. Thus, the first insulating member is directly connected to the conductive member 20.

Gas is subsequently delivered from the outside of the battery into the through-hole formed in the positive terminal 7 to bring the deformable plate 21 into close contact with the base portion 6a of the positive electrode current collector 6. The deformable plate 21 is connected to the base portion 6a of the positive electrode current collector 6 by laser welding. The periphery of the joint forming hole 6c formed in the base portion 6a of the positive electrode current collector 6 is welded to the deformable plate 21.

Thus, the conductive path of the positive electrode current collector 6—the deformable plate 21—the conductive member 20—the positive terminal 7 is formed. The through-hole formed in the positive terminal 7 is sealed by as terminal plug 19. The terminal plug 19 includes an elastic portion 19a and a metallic portion 19b.

A negative electrode conductive path is assembled by the following manner.

The outer insulating member 13 is disposed on the sealing plate 3 on the outside of the battery. The inner insulating member 12 is disposed on the sealing plate 3 on the inside of the battery and the base portion 8a of the negative electrode current collector 8 is disposed thereon. The insertion portion of the negative terminal 9 is inserted into the through-holes formed in the outer insulating member 13, the sealing plate 3, the inner insulating member 12, and the base portion 8a of the negative electrode current collector 8. A tip of the insertion portion of the negative terminal 9 is crimped on the base portion 8a of the negative electrode current collector 8. Thus, the negative terminal 9, the outer insulating member 13, the sealing plate 3, the inner insulating member 12, and the negative electrode current collector 8 are integrally secured to each other. The tip of the insertion portion is preferably welded to the base portion 8a of the negative electrode current collector 8 by laser welding.

Manufacture of Wound Electrode Body

A method of manufacturing the wound electrode body 1 will now be described. A positive electrode mixture containing lithium cobalt oxide ($LiCoO_2$) as the positive electrode active material, a conductive agent, and a binder is applied to both surfaces of a rectangular aluminum foil with a thickness of 15 µm as the positive electrode core so that the positive electrode active material mixture layer is formed. The positive electrode sheet is manufactured so as to include, at one short side, the exposed positive electrode core portion on which the positive electrode active material mixture is not formed within a predetermined width. A negative electrode mixture containing natural graphite powder as the negative electrode active material and a binder is applied to both surfaces of a rectangular copper foil with a thickness of 8 µm as the negative electrode core so that the negative electrode active material mixture layer is formed. The negative electrode sheet is manufactured so as to include, at one short side, the exposed negative electrode core portion on which the negative electrode active material mixture is not formed within a predetermined width.

A porous separator made of polyethylene is interposed between the positive electrode sheet and the negative electrode sheet thus obtained such that the exposed positive electrode core portion of the positive electrode sheet and the exposed negative electrode core portion of the negative electrode sheet do not overlap the opposing active material mixture layers of electrodes. The sheets and the separator are wound and then formed into a flat shape. Thus, the wound electrode body 1 is manufactured into a flat shape such that the exposed positive electrode core portion 4, at which a plurality of the positive electrode cores are stacked, is disposed at one end thereof and the exposed negative electrode core portion 5, at which a plurality of the negative electrode cores are stacked, is disposed at the other end thereof.

Assembly of Battery

The positive electrode current collector 6 and the negative electrode current collector 8 that are connected to the sealing plate 3 are connected to the exposed positive electrode core portion 4 and exposed negative electrode core portion 5 of the wound electrode body 1, respectively. The wound electrode body 1 is wrapped with the insulation seat 14 that is bent into the form of a box. The wound electrode body 1 is inserted into the prismatic exterior body 2. The sealing plate 3 is then welded to the prismatic exterior body 2 by laser welding to seal the opening of the prismatic exterior body 2 by the sealing plate 3. A non-aqueous electrolyte containing an electrolyte solvent and an electrolyte salt is poured from the electrolytic solution injecting hole 15. The electrolytic solution injecting hole 15 is sealed by the sealing plug 16 so that the prismatic secondary battery 100 is obtained.

Prismatic Secondary Battery 100

While developing a current interrupt mechanism, the present inventors found that the base portion 6a of the positive electrode current collector 6 may be misaligned so as to be rotated in the horizontal direction with respect to the first insulating member 22 even when the base portion 6a of the positive electrode current collector 6 is connected to the first insulating member 22. Such a problem is likely to occur when the first insulating member 22 is made of a relatively soft resin. The present inventors found that the above problem can be solved in a manner in which a rotation preventing protrusion is disposed on the lower surface of the first insulating member 22 and outside an outer circumferential edge of the base portion 6a of the positive electrode current collector 6.

In the prismatic secondary battery 100, the rotation preventing protrusions are formed on the lower surface of the first body 22a of the first insulating member 22 in addition to the joint between the first insulating member 22 and the base portion 6a of the positive electrode current collector 6. Accordingly, the above problem can be solved.

As illustrated in FIG. 11, the outer circumferential edges of the base portion 6a of the positive electrode current collector 6 include a rectilinear first end side portion 70a, a rectilinear second end side portion 70b, a rectilinear third end side portion 70c, a rectilinear fourth end side portion 70d, and a rectilinear fifth end side portion 70e that are not aligned. The first rotation preventing protrusions 30a are disposed outside the first end side portion 70a. One of the third rotation preventing protrusions 30c is disposed outside the second end side portion 70b. The other third rotation preventing protrusion 30c is disposed outside the third end side portion 70c. One of the second rotation preventing protrusions 30b is disposed outside the fourth end side portion 70d. The other second rotation preventing protrusion 30b is disposed outside the fifth end side portion 70e.

In order to more reliably prevent the base portion 6a of the positive electrode current collector 6 from being moved so as to be rotated in the horizontal direction with respect to the first insulating member 22, the base portion 6a of the positive electrode current collector 6 preferably includes at least two different rectilinear end side portions and the rotation preventing protrusions are preferably disposed outside the respective two end side portions. In addition, the base portion 6a of the positive electrode current collector 6 preferably includes at least three different rectilinear end side portions and the rotation preventing protrusions are preferably disposed outside the respective three end side portions.

A recessed portion may be formed on one of the rectilinear end side portions and one of the rotation preventing protrusions may be fitted into the recessed portion.

The first insulating member 22 includes the pair of the first catch portions 26a and the pair of the second catch portions 26b. The pair of the first catch portions 26a and the pair of the second catch portions 26b are connected to the second insulating member 10.

Possible positions at which the first insulating member 22 is connected to the second insulating member 10 are both ends thereof in the transverse direction of the sealing plate 3. That is, a possible structure is that the pair of the second catch portions 26b are disposed on both ends of the first insulating member 22 in the transverse direction of the sealing plate 3 and the pair of the first catch portions 26a are not disposed on both ends of the first insulating member 22 in the longitudinal direction of the sealing plate 3. In such a structure, both ends of the first insulating member 22 in the longitudinal direction of the sealing plate 3 may be misaligned in the vertical direction with the joints between the second catch portions 26b of the first insulating member 22 and the second insulating member 10 serving as fulcrums. In the case where the first insulating member 22 is made of a relatively soft resin, the first insulating member 22 may be deformed so as to bend in response to an impact or vibration and both ends of the first insulating member 22 in the longitudinal direction of the sealing plate 3 may be misaligned in the vertical direction.

In contrast, in the case where the pair of the first catch portions 26a and the pair of the second catch portions 26b are disposed on the first insulating member 22 and the pair of the first catch portions 26a and the pair of the second catch portions 26b are connected to the second insulating member 10, both ends of the first insulating member 22 in the longitudinal direction of the sealing plate 3 can be reliably prevented from being misaligned in the vertical direction.

The first insulating member and the second insulating member are preferably made of a resin. Examples of the materials of the first insulating member and the second insulating member include polypropylene, polyethylene, polyphenylene sulfide, polyetheretherketone, polycarbonate, tetrafluoroethylene, perfluoroalkyl ethylene, and a copolymer of tetrafluoroethylene and perfluoroalkyl ethylene. In particular, polypropylene is preferable. The present invention is particularly effective when the first insulating member is made of a relatively soft resin. In the case where the first insulating member is made of polypropylene or a resin having a flexural modulus (ASTM D790) lower than the flexural modulus of polypropylene, for example, the present invention is particularly effective. In the case where the first insulating member has a flexural modulus (ASTM D790) of 5 GPa or less, the present invention is particularly effective. In the case where the first insulating member has a flexural modulus (ASTM D790) of 2 GPa or less, the present invention is more particularly effective. In the case where the first insulating member is made of a relatively soft resin, the current interrupt mechanism is readily installed and the first insulating member can be reliably prevented from being damaged during the installation. The first insulating member and the second insulating member may be made of different materials.

The first insulating member is preferably transparent. When the first insulating member is transparent, for example, a state of a connection between the conductive member 20 and the deformable plate 21 can be checked by seeing through the first securing portion 35a or the second securing portion 35b.

In an example of the prismatic secondary battery 100, the current interrupt mechanism is disposed on the positive electrode conductive path. The current interrupt mechanism, however, may be disposed on the negative electrode conductive path.

In an example of the prismatic secondary battery 100, the first insulating member 22 is directly connected to the conductive member 20 by using the third catch portions 25a and the fourth catch portions 25b. The third catch portions 25a and the fourth catch portions 25b, however, are not essential components. It is not necessary for the first insulating member 22 to be directly connected to the conductive member 20. In the prismatic secondary battery 100, the second insulating member 10 is integrally secured to the conductive member 20 by using the positive terminal 7. The first insulating member 22 is directly connected to the second insulating member 10 by using the first catch portions 26a or the second catch portions 26b. For this reason, the positive electrode current collector 6 is connected to the deformable plate 21 at a portion other than the joint between the deformable plate 21 and the base portion 6a with the first insulating member 22, the second insulating member 10, and the conductive member 20 interposed therebetween. Accordingly, loads on the fragile portion and the joint between the deformable plate 21 and the base portion 6a are decreased. In order to further decrease the loads on the fragile portion and the joint between the deformable plate 21 and the base portion 6a, the first insulating member 22 is preferably directly connected to the conductive member 20.

In the case where the first insulating member 22 is directly connected to the conductive member 20, the first insulating member 22 may not be directly connected to the second insulating member 10. In order to further decrease the loads on the fragile portion and the joint between the deformable plate 21 and the base portion 6a, however, the first insulating member 22 is preferably directly connected to the second insulating member 10 and the first insulating member 22 is preferably directly connected to the conductive member 20.

In an example of the prismatic secondary battery 100, the first catch portions 26a of the first insulating member 22 are connected to the first receiving portions 10x disposed on the second insulating member 10 on the upper surface side and the second catch portions 26b of the first insulating member 22 are connected to the second receiving portions 10y disposed on the second insulating member 10 on the upper surface side.

However, recessed portions may be formed at central portions or lower portions of the first side walls 10b and second side walls 10c of the second insulating member 10 in the vertical direction (direction perpendicular to the sealing plate 3) and the recessed portions may serve as the first receiving portions 10x or the second receiving portions 10y.

In a method of connecting the first insulating member 22 to the second insulating member 10, connecting protruding portions may be disposed on the outer surfaces of the first side walls 10b or second side walls 10c of the second insulating member 10 and joints including receiving portions each having a shape suitable to fit each of the connecting protruding portions of the second insulating member 10 into the corresponding receiving portion may be disposed on the first insulating member 22. For example, the recessed portions may be disposed on the third side walls 24 of the first insulating member 22 on the inner surface side and the connecting protruding portions of the second insulating member 10 may be fitted into the recessed portions.

Modification

A prismatic secondary battery according to a modification has fundamentally the same structure as the prismatic secondary battery 100 but differs from the prismatic secondary battery 100 in having a different current interrupt mechanism and a different structure around the current interrupt mechanism. In the prismatic secondary battery according to the modification, a cup-shaped conductive member that is substantially rectangular in section in the direction parallel to a cylindrical sealing plate is used instead of the conductive member 20, which is circular in section in the direction parallel to the cylindrical sealing plate. A deformable plate that is substantially rectangular in plan view is used in accordance with the shape of the opening portion of the conductive member. In the prismatic secondary battery according to the modification, the shape of a second insulating member disposed between the sealing plate and the conductive member, the shape of a first insulating member disposed between the deformable plate and a base portion of a positive electrode current collector, and the shape of the positive electrode current collector differ from those in the prismatic secondary battery 100, as described below.

Figure 12:
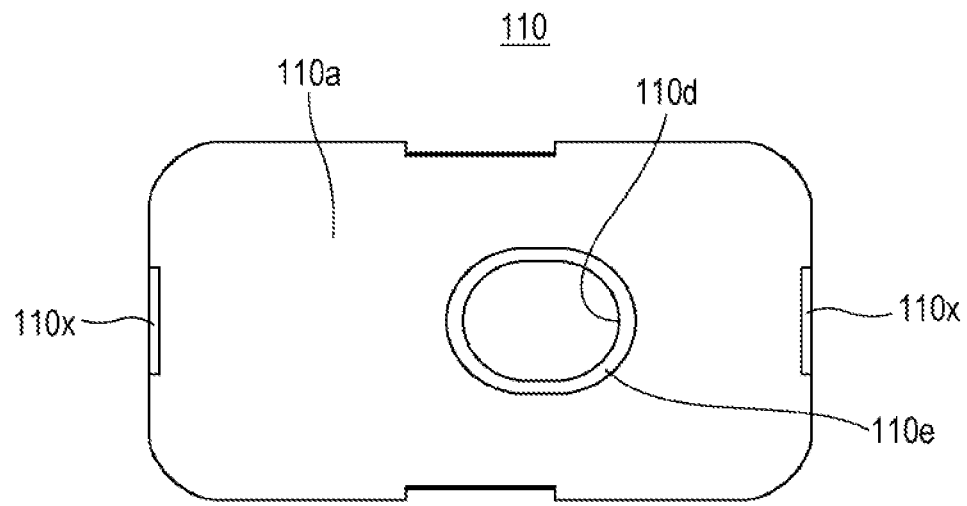
FIG. 12 is a top view of a second insulating member used in a prismatic secondary battery according to a modification.

FIG. 12 is a top view of a second insulating member 110 used in the prismatic secondary battery according to the modification (view of a surface on the sealing plate side). The second insulating member 110 includes a second body 110a. A second through-hole 110d is formed in a central portion of the second body 110a. The second through-hole 110d is formed at a position away from the center of the second body 110a to one end thereof in the longitudinal direction of the second body 110a. A first thin portion 110e is formed around the second through-hole 110d. First receiving portions 110x are disposed on both ends of the second body 110a in the longitudinal direction.

Figure 13:
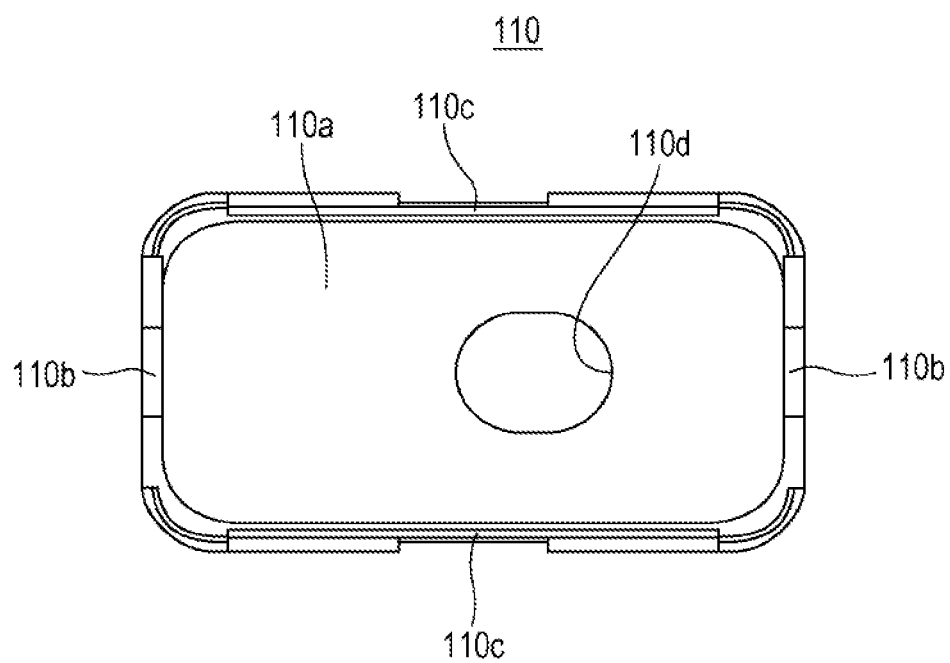
FIG. 13 is a bottom view of the second insulating member used in the prismatic secondary battery according to the modification.

FIG. 13 is a bottom view of the second insulating member 110 used in the prismatic secondary battery according to the modification. A pair of first side walls 110b and a pair of second side walls 110c that extend downward (electrode body side) are disposed on the outer circumferential edges of the lower surface (surface on the electrode body side) of the second body 110a. The first side walls 110b and the second side walls 110c are continuously formed. Accordingly, an annular side wall is formed of the pair of the first side walls 110b and the pair of the second side walls 110c on the lower surface of the second insulating member 110.

Figure 14:
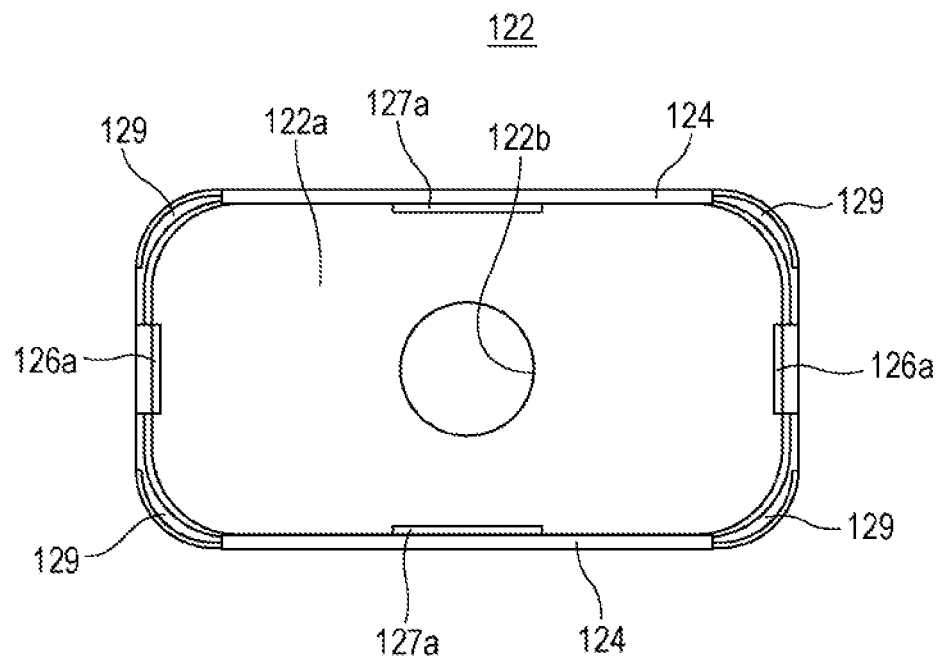
FIG. 14 is a top view of a first insulating member used in the prismatic secondary battery according to the modification.

FIG. 14 is a top view of a first insulating member 122 used in the prismatic secondary battery according to the modification. The first insulating member 122 includes a first body 122a. A first through-hole 122b is formed in a central portion of the first body 122a. First catch portions 126a are disposed on both ends of the first body 122a in the longitudinal direction. The first catch portions 126a of the first insulating member 122 are caught on the first receiving portions 110x of the second insulating member 110 so that the first insulating member 122 is connected to the second insulating member 110. Third side walls 124 are disposed on both ends of the first body 122a in the transverse direction. A pair of first pressing portions 127a are disposed at the bottoms of the third side walls 124. The pair of the first pressing portions 127a press the outer circumferential surface of the conductive member 20 from both sides. Fourth side walls 129 are disposed between the first catch portions 126a and the third side walls 124 on the outer circumferential edges of the first body 122a. The fourth side walls 129 are preferably disposed so as to overlap the first side walls 110b or second side walls 110c of the second insulating member 110 in the direction of the width of the fourth side walls 129.

Figure 15:
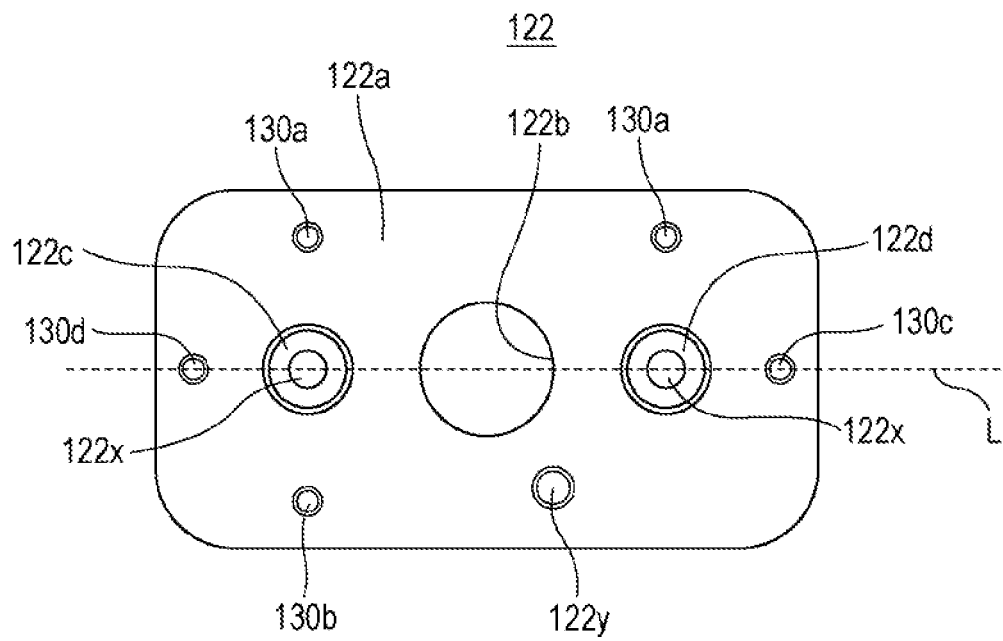
FIG. 15 is a bottom view of the first insulating member used in the prismatic secondary battery according to the modification.

FIG. 15 is a bottom view of the first insulating member 122 used in the prismatic secondary battery according to the modification. A first protrusion 122c and a second protrusion 122d are formed on the lower surface of the first body 122a. The first protrusion 122c, the first through-hole 122b, and the second protrusion 122d are aligned along a line L in the longitudinal direction of the first insulating member 122. A fifth protrusion 122y is disposed on the lower surface of the first body 122a. The fifth protrusion 122y is disposed at a position away from the line L in the transverse direction of the first insulating member 122. Recessed portions 122x are formed on the surfaces of the tips of the first protrusion 122c and the second protrusion 122d. Fourth rotation preventing protrusions 130a, a fifth rotation preventing protrusion 130b, a sixth rotation preventing protrusion 130c, and a seventh rotation preventing protrusion 130d are disposed on the lower surface of the first body 122a.

Figure 16:
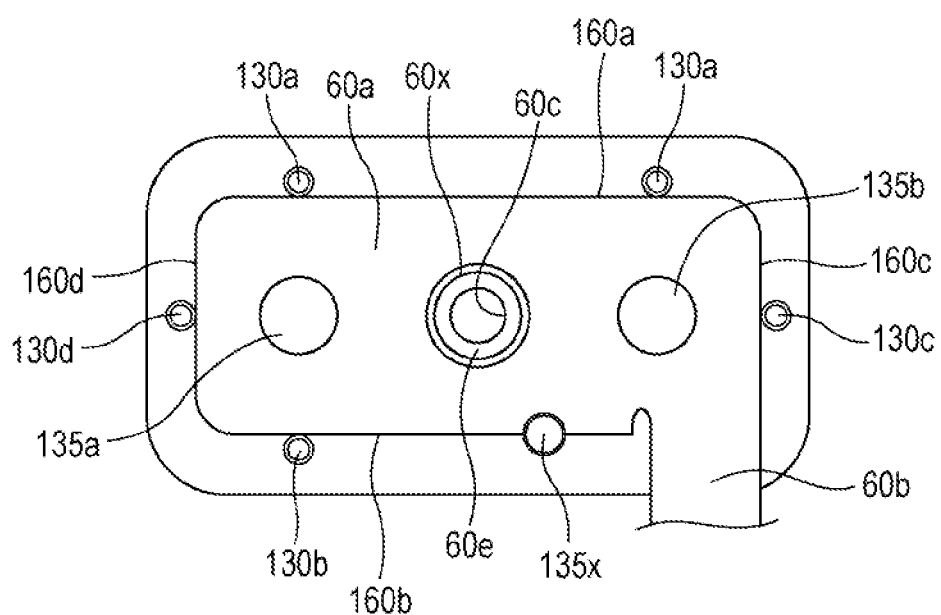
FIG. 16 is a view of the prismatic secondary battery according to the modification illustrating a state in which a base portion of a positive electrode current collector is disposed on the lower surface of the first insulating member and the base portion is connected to the first insulating member.

FIG. 16 illustrates a state in which a base portion 60a of a positive electrode current collector 60 is disposed on the lower surface of the first insulating member 122 and the base portion 60a is connected to the first insulating member 122. The first protrusion 122c and second protrusion 122d of the first insulating member 122 are inserted into a first opening and a second opening formed in the base portion 60a. The diameters of the tips of the first protrusion 122c and the second protrusion 122d are increased so that a first seeming portion 135a and a second securing portion 135b are formed. A notch is formed in an outer circumferential edge of the base portion 60a of the positive electrode current collector 60. The fifth protrusion 122y is fitted into the notch and the tip thereof is increased so that a fifth securing portion 135x is formed. The first insulating member 122 is connected to the base portion 60a of the positive electrode current collector 60 by using the first securing portion 135a, the second securing portion 135b, and the fifth securing portion 135x.

The fourth rotation preventing protrusions 130a, the fifth notation preventing protrusion 130b, the sixth rotation preventing protrusion 130c, and the seventh rotation preventing protrusion 130d are disposed outside the outer circumferential edges of the base portion 60a of the positive electrode current collector 60. The outer circumferential edges of the base portion 60a of the positive electrode current collector 60 include a rectilinear sixth end side portion 160a, a rectilinear seventh end side portion 160b, a rectilinear eighth end side portion 160c, and a rectilinear ninth end side portion 160d.

The fourth rotation preventing protrusions 130a are disposed outside the sixth end side portion 160a. The fifth rotation preventing protrusion 130b is disposed outside the seventh end side portion 160b. The sixth rotation preventing protrusion 130c is disposed outside the eighth end side portion 160c. The seventh rotation preventing protrusion 130d is disposed outside the ninth end side portion 160d. In order to more reliably prevent the base portion 60a of the positive electrode current collector 60 from being moved so as to be rotated in the horizontal direction with respect to the first insulating member 122, the base portion 60a of the positive electrode current collector 60 preferably includes at least two different rectilinear end side portions and the rotation preventing protrusions are preferably disposed outside the respective two end side portions. The base portion 60a of the positive electrode current collector 60 more preferably includes at least three different rectilinear end side portions and the rotation preventing protrusions are preferably disposed outside the respective three end side portions.

A joint forming hole 60c is formed in the base portion 60a of the positive electrode current collector 60 and the periphery of the joint forming hole 60c is connected to the deformable plate by welding. A thin region 60e is formed around the joint forming hole 60c. An annular groove 60x is formed on the thin region 60e so as to surround the joint forming hole 60c. A lead portion 60b is disposed on the base portion 60a of the positive electrode current collector 60. The joint forming hole 60c is not an essential component. A thin portion may be formed on the base portion 60a, and the thin portion may be connected to the deformable plate.

In an example of the prismatic secondary battery 100, the wound electrode body is used. The structure of the electrode body, however, is not particularly limited. For example, a stack-type electrode body in which plural positive electrode sheets and plural negative electrode sheets are stacked with separators interposed therebetween may be used.

In an example of the prismatic secondary battery 100, the terminal and the conductive member are different components. The terminal and the conductive member, however, may be an integral component. In this case, the terminal may be inserted from the inside of the battery into a through-hole formed in the sealing plate, and a tip of the terminal may be crimped on the sealing plate on the outer surface side.

Any one of positive electrode active materials, negative electrode active materials, and non-aqueous electrolytes that are generally used in non-aqueous electrolyte secondary batteries may be used.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
an electrode body that includes a positive electrode sheet and a negative electrode sheet;
a current collector that is connected to the positive electrode sheet or the negative electrode sheet;
an exterior body that has an opening and contains the electrode body;
a sealing plate that seals the opening;
a terminal that is electrically connected to the current collector and that is attached to the sealing plate;
a conductive member that has an opening portion on an electrode body side and that is disposed on a side nearer to the electrode body than the sealing plate; and
a conductive deformable plate that seals the opening portion,
wherein the current collector, the deformable plate, the conductive member, and the terminal are electrically connected to one another,
wherein the current collector includes a base portion disposed on the electrode body side of the deformable plate,
wherein the current collector is connected to the deformable plate at the base portion,
wherein a first insulating member is disposed between the deformable plate and the base portion,
wherein the first insulating member is connected to the conductive member and the base portion,
wherein the first insulating member includes a rotation preventing protrusion on a surface thereof on the electrode body side and outside an outer circumferential edge of the, current collector and
wherein, when a pressure inside the battery is higher than or equal to a predetermined value, the deformable plate is deformed and a fragile portion is broken due to deformation of the deformable plate so that a conductive path between the positive electrode sheet or the negative electrode sheet and the terminal is disconnected.

2. The secondary battery according to claim 1,
wherein the first insulating member includes at least two of the rotation preventing protrusions.

3. The secondary battery according to claim 1,
wherein the outer circumferential edge of the base portion includes a rectilinear first end side portion and a rectilinear second end side portion,
wherein the first insulating member includes a first rotation preventing protrusion and a second rotation preventing protrusion as the rotation preventing protrusion,
wherein the first rotation preventing protrusion is disposed outside the first end side portion, and
wherein the second rotation preventing protrusion is disposed outside the second end side portion.

4. The secondary battery according to claim 1,
wherein the first insulating member includes a protrusion, and the base portion includes a through-hole or a notch, and
wherein the protrusion is fitted into the through-hole or the notch so that the first insulating member is connected to the base portion.

5. The secondary battery according to claim 1,
wherein the first insulating member includes a protrusion, and the base portion includes a through-hole or a notch,
wherein the protrusion is fitted into the through-hole or the notch and a diameter of a tip of the protrusion is increased so that a securing portion at which the first insulating member is secured to the base portion is formed, and
wherein at least three of the securing portions are formed.

6. The secondary battery according to claim 1,
wherein the first insulating member is directly connected to the conductive member.

7. The secondary battery according to claim 1,
wherein a second insulating member is disposed between the sealing plate and the conductive member,
wherein the terminal, the second insulating member, and the conductive member are secured to the sealing plate,
wherein the first insulating member is directly connected to the second insulating member, and
wherein the first insulating member is connected to the conductive member with the second insulating member interposed therebetween.

8. The secondary battery according to claim 1,
wherein a diameter of a tip of the rotation preventing protrusion is smaller than or equal to a diameter of a bottom of the rotation preventing protrusion.

9. The secondary battery according to claim 1,
wherein the first insulating member includes a plurality of the rotation preventing protrusions, and
wherein the first insulating member includes a plurality of the rotation preventing protrusions that are disposed so as to be aligned along a rectilinear end side of the base portion of the current collector, and a pair of the rotation preventing protrusions that are disposed so as to interpose the base portion of the current collector therebetween.

10. The secondary battery according to claim 1,
wherein a series of at least three rotation prevention protrusions are linearly disposed on the first insulating member in a direction along a short side of the sealing plate.

11. The secondary battery according to claim 1,
wherein a second insulating member is disposed between the sealing plate and the conductive member;
the first insulating member includes an insulating member rotation preventing protrusion on a surface thereof which faces toward the sealing plate; and
the insulating member rotation preventing protrusion is disposed outside an outer circumferential edge of the second insulating member.

12. The secondary battery according to claim 11,
wherein the first insulating member includes a plurality of insulating member rotation preventing protrusions.

13. The secondary battery according to claim 11,
wherein a distance between the insulating member rotation preventing protrusion and the second insulating member is 1 mm or less.

14. The secondary battery according to claim 1,
wherein the conductive member includes a flange at an edge thereof which extends toward the electrode body;
the first insulating member includes a pair of first pressing portions on a surface thereof which faces toward the sealing plate;
the pair of first pressing portions are disposed on opposite sides of the flange, so as to hold the flange in place between the pair of first pressing portions; and
each of the pair of first pressing portions comprises a curved shape that conforms to an outer circumference of the conductive member.

15. The secondary battery according to claim 14,
wherein the first insulating member includes a pair of second pressing portions on the surface thereof which faces toward the sealing plate;
the pair of second pressing portions are disposed on opposite sides of the flange, so as to hold the flange in place between the pair of second pressing portions; and
each of the pair of second pressing portions comprises a curved shape that conforms to the outer circumference of the conductive member.

16. The secondary battery according to claim 14,
wherein a second insulating member is disposed between the sealing plate and the conductive member;
the first insulating member includes a pair of first catch portions on the surface thereof which faces toward the sealing plate;
each of the pair of first catch portions is connected to the second insulating member; and
the pair of first pressing portions are positioned at respective proximal ends of the pair of first catch portions.

17. The secondary battery according to claim 15,
wherein a second insulating member is disposed between the sealing plate and the conductive member;
the first insulating member includes a pair of second catch portions on the surface thereof which faces toward the sealing plate;
each of the pair of second catch portions is connected to the second insulating member; and
the pair of second pressing portions are positioned at respective proximal ends of the pair of second catch portions.

18. The secondary battery according to claim 11,
wherein the conductive member includes a flange at an edge thereof which extends toward the electrode body;
the first insulating member includes a pair of first pressing portions on a surface thereof which faces toward the sealing plate;
the pair of first pressing portions are disposed on opposite sides of the flange, so as to hold the flange in place between the pair of first pressing portions; and
each of the pair of first pressing portions comprises a curved shape that conforms to an outer circumference of the conductive member.

19. The secondary battery according to claim 18,
wherein the first insulating member includes a pair of second pressing portions on the surface thereof which faces toward the sealing plate;
the pair of second pressing portions are disposed on opposite sides of the flange, so as to hold the flange in place between the pair of second pressing portions; and
each of the pair of second pressing portions comprises a curved shape that conforms to the outer circumference of the conductive member.

* * * * *